United States Patent
Kenyon et al.

(10) Patent No.: US 6,994,007 B2
(45) Date of Patent: Feb. 7, 2006

(54) CHOP SAW

(75) Inventors: Maria I. Kenyon, Taneytown, MD (US); Daryl S. Meredith, Hampstead, MD (US); Steven A. Shull, Parkville, MD (US); Gregg L. Sheddy, Shrewsbury, PA (US)

(73) Assignee: Black & Decker Inc., Newark, DE (US)

( * ) Notice: Subject to any disclaimer, the term of this patent is extended or adjusted under 35 U.S.C. 154(b) by 15 days.

(21) Appl. No.: 10/191,681

(22) Filed: Jul. 9, 2002

(65) Prior Publication Data

US 2004/0007111 A1    Jan. 15, 2004

(51) Int. Cl.
*B26D 7/02* (2006.01)
*B26D 5/08* (2006.01)

(52) U.S. Cl. ............. 83/468.7; 83/471.3; 83/473; 83/478; 83/490; 83/581

(58) Field of Classification Search ......... 83/468.7, 83/581, 471.3, 478, 473, 490
See application file for complete search history.

(56) References Cited

U.S. PATENT DOCUMENTS

| | | | |
|---|---|---|---|
| 4,693,008 A | * | 9/1987 | Velie ............... 30/390 |
| 5,129,300 A | * | 7/1992 | Kawakami ........ 83/471.2 |
| 5,297,463 A | | 3/1994 | O'Banion et al. |
| 5,564,323 A | | 10/1996 | Sasaki et al. |
| 5,865,079 A | | 2/1999 | Itzov |
| 6,615,701 B2 | * | 9/2003 | Hollinger et al. ..... 83/473 |

FOREIGN PATENT DOCUMENTS

DE    202 08 202 U1    8/2002
EP    0 997 243 A1    5/2000

OTHER PUBLICATIONS

D. Chariot, Partial European Search Report on European Patent Application No. EP 03 01 3821, Oct. 15, 2003, The Hague.
Annex to the European Search Report on European Search Report on European Patent Application No. EP 03 01 3821.

* cited by examiner

*Primary Examiner*—Kenneth E. Peterson
*Assistant Examiner*—Isaac N. Hamilton
(74) *Attorney, Agent, or Firm*—Adan Ayala

(57) ABSTRACT

A saw including a base, a trunnion pivotally attached to the base, a pivot arm pivotally attached to the trunnion, a saw assembly supported by the pivot arm, the saw assembly including a motor, a blade driven by the motor, an upper blade guard for covering an upper part of the blade, and at least one of a lower blade guard pivotally attached to the upper blade guard for covering a lower part of the blade and a rear blade guard attached to the upper blade guard, and a fence assembly comprising a fixed fence attached to the base, and a movable fence movably attached to the fixed fence, wherein the movable fence has a stepped portion for limiting lateral movement of the at least one of the lower blade guard and the rear blade guard.

8 Claims, 2 Drawing Sheets

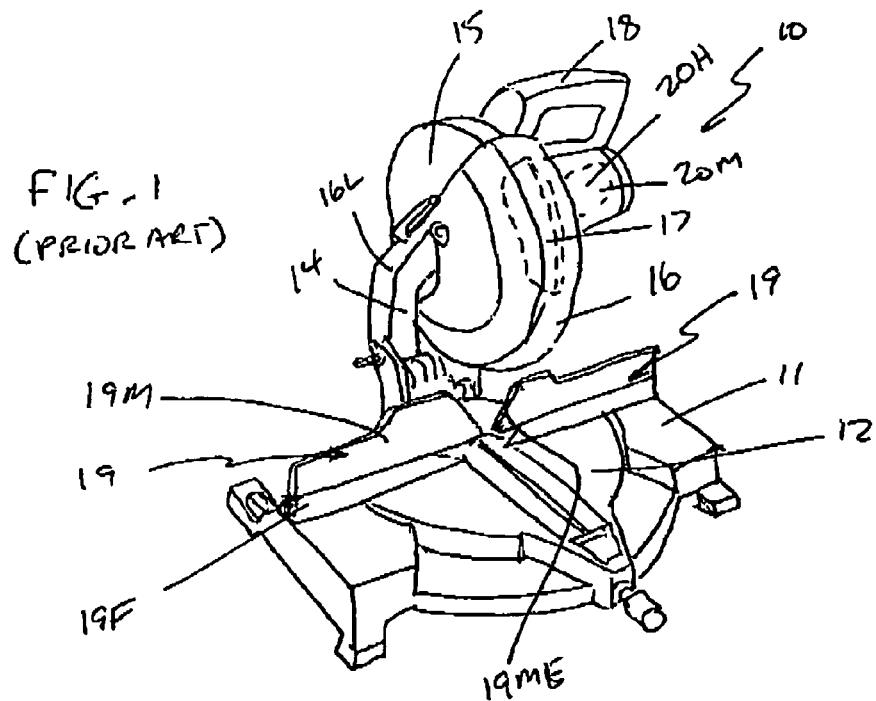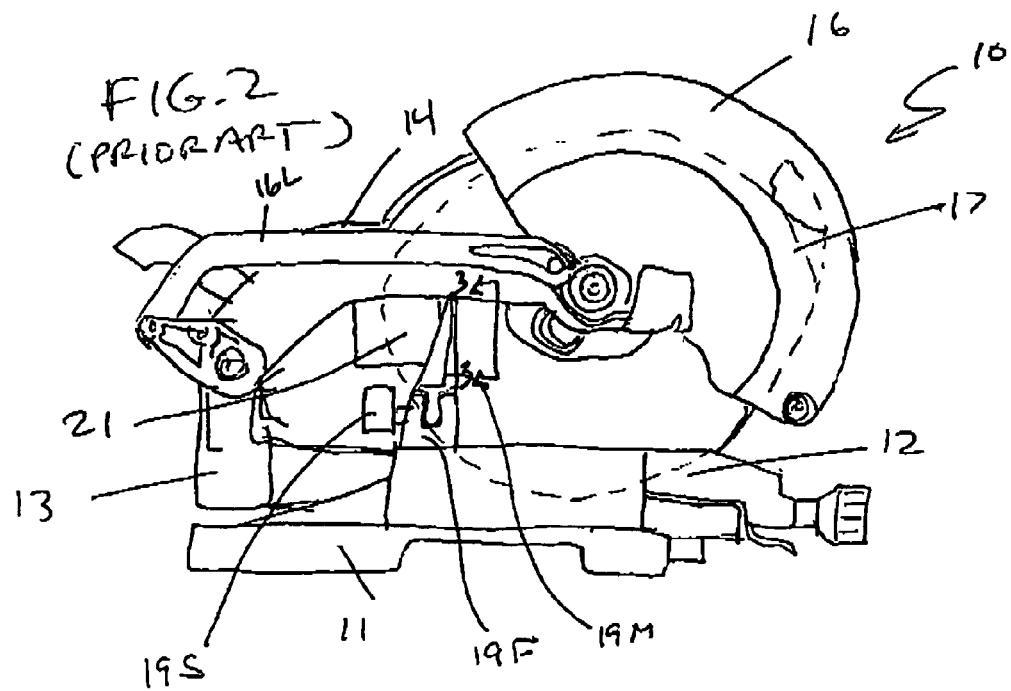

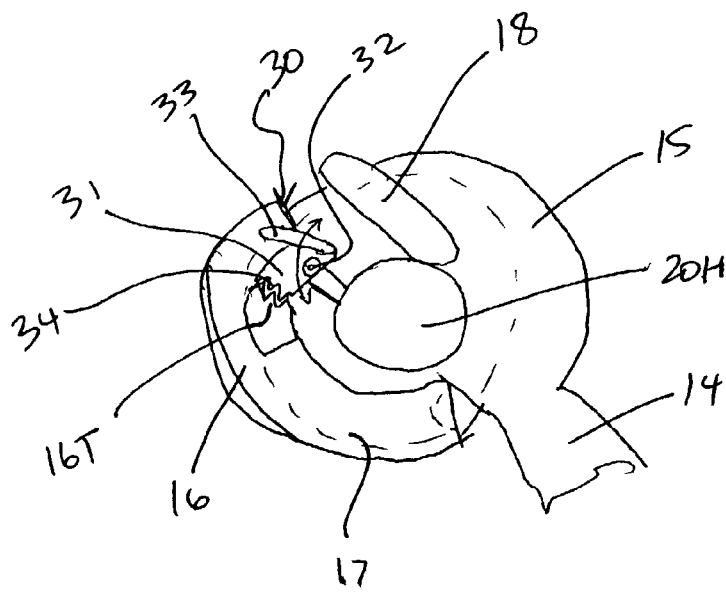
FIG. 4
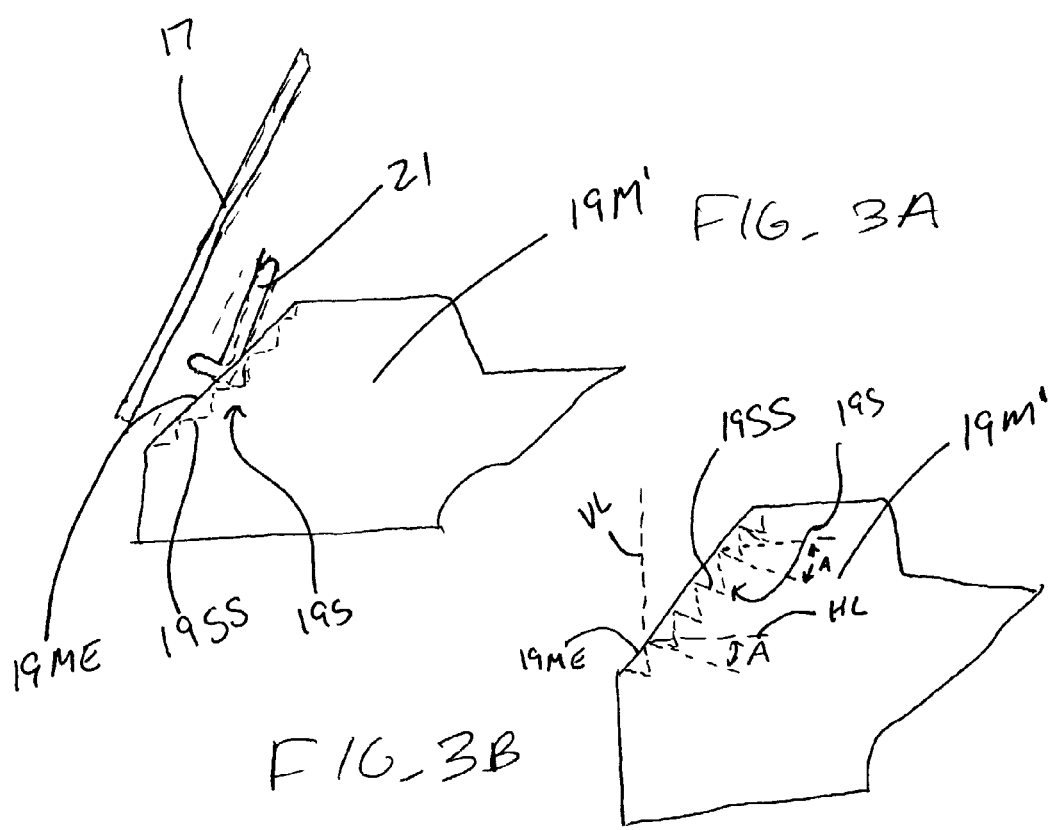
FIG. 3A
FIG. 3B

CHOP SAW

FIELD OF THE INVENTION

This invention relates generally to chop saws and specifically to miter saws.

BACKGROUND OF THE INVENTION

Chop saws and miter saws designed for cutting a workpiece are well known in the art. Referring to FIGS. 1–2, a miter saw 10 typically has a base 11, which may include a rotatable table 12 rotatably attached to base 11. A pivot arm 14 is pivotally attached to a trunnion 13, to allow a chopping function. Trunnion 13 in turn may be pivotally attached to the base 11 and/or table 12, to allow the trunnion 13 and pivot arm 14 to pivot relative to the base 11.

The pivot arm 14 carries a saw assembly which includes motor housing 20H, a motor 20M disposed in motor housing 20H, a blade 17 driven by motor 20M, an upper blade guard 15 covering an upper part of the blade 17, and a lower blade guard 16 pivotally attached to upper blade guard 15 for covering a lower part of the blade 17. A link 16L may connect lower blade guard 16 to trunnion 13 so that, as the saw assembly is pivoted downwardly to cut a workpiece disposed on base 11 and/or table 12, the lower blade guard 16 rotates and exposes the blade 17, as is well known in the art.

The pivot arm 14 may also carry a rear blade guard 21, which is typically made of metal.

A fence assembly 19 may be provided on both sides of blade 17. Persons skilled in the art are referred to the fence assemblies disclosed in U.S. Pat. Nos. 5,297,463 and 5,733,148, which are wholly incorporated herein by reference. Fence assembly 19 has a fixed fence 19F disposed on base 11, a movable fence 19M slidably disposed on fixed fence 19F, and a screw 19S for fixing the position of movable fence 19M relative to fixed fence 19F.

It is possible that when the user has beveled the saw assembly, i.e., pivoted the trunnion 13 relative to table 12, and pivots the saw assembly downwardly, the lower blade guard 16 or rear guard 21 may contact the movable fence 19M. Because the movable fence 19M typically has an inclined edge 19ME, the lower blade guard 16 and/or rear guard 21 may be forced into contact with blade 17, which could ultimately cut the lower blade guard 16 and/or rear guard 21.

SUMMARY OF THE INVENTION

In accordance with the present invention, an improved chop saw is employed. The saw includes a base, a trunnion pivotally attached to the base, a pivot arm pivotally attached to the trunnion, a saw assembly supported by the pivot arm, the saw assembly including a motor, a blade driven by the motor, an upper blade guard for covering an upper part of the blade, and at least one of a lower blade guard pivotally attached to the upper blade guard for covering a lower part of the blade and a rear blade guard attached to the upper blade guard, and a fence assembly comprising a fixed fence attached to the base, and a movable fence movably attached to the fixed fence, wherein the movable fence has a stepped portion for limiting lateral movement of the at least one of the lower blade guard and the rear blade guard.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 1 is a perspective view of a prior art miter saw;

FIG. 2 is a left side view of the prior art miter saw of FIG. 1;

FIG. 3 illustrates a movable fence according to the invention, where FIGS. 3A–3B show two embodiments of the movable fence; and FIG. 4 is a right side view of the saw assembly, including a guard lock mechanism according to the invention.

DETAILED DESCRIPTION

The invention is now described with reference to the accompanying figures, wherein like numerals designate like parts. Referring to FIGS. 1–3, an improved fence assembly according to the invention comprises a fixed fence 19F disposed on base 11, a movable fence 19M' slidably disposed on fixed fence 19F, and a screw 19S for fixing the position of movable fence 19M' relative to fixed fence 19F. Persons skilled in the art will recognize that other means may be used to fix the position of movable fence 19M' relative to fixed fence 19F, as discussed in U.S. Pat. Nos. 5,297,463 and 5,733,148, which are wholly incorporated herein by reference.

Movable fence 19M' may have an inclined edge 19ME. In addition, movable fence 19M' may have a stepped portion 19S disposed in front or behind of inclined edge 19ME. Persons skilled in the art will also recognize that stepped portion 19S may replace inclined edge 19ME.

Stepped portion 19S preferably has multiple steps 19SS which are substantially horizontal as shown in FIG. 3A. Alternatively, the steps 19SS may be inclined as shown in FIG. 3B. Preferably, a horizontal line HL and a step 19SS form an angle A which between 0° and about 45°. In other words, the steps 19SS will form a right angle or an obtuse angle relative to a vertical line VL, which is preferably substantially perpendicular to the base 11 and/or table 12. Preferably the angle A for all all steps 19SS will be substantially equal.

When lower blade guard 16 and/or rear guard 21 contact one of the steps 19SS, the lateral movement of lower blade guard 16 and/or rear guard 21 is limited, so that lower blade guard 16 and/or rear guard 21 will not contact blade 17.

It is also preferable to provide a guard lock mechanism 30 to prevent unwanted exposure of blade 17. Referring to FIG. 4, guard lock mechanism 30 preferably includes a body 31 pivotally attached to upper blade guard 15 via pivot 32. A handle 33 is provided on body 31 for pivoting body 31. Body 31 may have teeth 34, which contact lower blade guard 16. Preferably, lower blade guard 16 has teeth 16T, which mesh with teeth 34.

With such arrangement, when the saw assembly is in the upward position, teeth 34 contact lower blade guard 16 and/or teeth 16T. If a user attempts to move the saw assembly downwardly, the user will be prevented from doing so, since teeth 34 will prevent lower blade guard 16 from moving upwardly. The user can only move the saw assembly downwardly if the user pivots body 31 upwardly, disengaging teeth 34 and clearing the lower blade guard 16 and/or teeth 16T.

When the user releases the body 31, body 31 will pivot downwardly because of gravity. Alternatively, a spring (not shown) may bias body 31 towards the downward position.

Persons skilled in the art will recognize that body 31 is pivoted about an axis which is substantially parallel to the axis of rotation of blade 17.

Persons skilled in the art may recognize other additions or alternatives to the means disclosed herein. However, all these additions and/or alterations are considered to be equivalents of the present invention.

We claim:

1. A saw comprising:
   a base;
   a trunnion pivotally attached to the base;
   a pivot arm pivotally attached to the trunnion;
   a saw assembly supported by the pivot arm, the saw assembly including a motor, a blade driven by the motor, an upper blade guard for covering an upper part of the blade, and at least one of a lower blade guard pivotally attached to the upper blade guard for covering a lower part of the blade and a rear blade guard attached to the upper blade guard; and
   a fence assembly comprising a fixed fence attached to the base, and a movable fence movably attached to the fixed fence;
   wherein the movable fence has an inclined surface movable near the blade, and a stepped portion disposed on the inclined surface that may be contacted by the at least one of the lower blade guard and the rear blade guard, the stepped portion limiting lateral movement of the at least one of the lower blade guard and the rear blade guard upon contact with the at least one of the lower blade guard and the rear blade guard.

2. The saw of claim 1, wherein the stepped portion has multiple steps.

3. The saw of claim 2, wherein the steps are substantially horizontal.

4. The saw of claim 2, wherein the steps are substantially inclined.

5. The saw of claim 4, wherein the angle of inclination is between 0° and 45°.

6. The saw of claim 1, wherein the base further comprises a table rotatably attached to the base.

7. The saw of claim 6, wherein the trunnion is pivotally connected to the table.

8. The saw of claim 1, further comprising a guard lock mechanism pivotally attached to the upper blade guard.

* * * * *